United States Patent [19]

Kumata et al.

[11] Patent Number: 4,542,165
[45] Date of Patent: Sep. 17, 1985

[54] POLYURETHANE BASED ON EPOXY-CONTAINING POLYMER POLYOL AND PROCESS FOR MAKING THE SAME

[75] Inventors: Koji Kumata, Yawata; Masao Fukuda, Uji, both of Japan

[73] Assignee: Sanyo Chemical Industries, Ltd., Kyoto, Japan

[21] Appl. No.: 641,193

[22] Filed: Aug. 16, 1984

[30] Foreign Application Priority Data

Sep. 8, 1983 [JP] Japan ............................ 58-166208
Dec. 6, 1983 [JP] Japan ............................ 58-230842
Apr. 16, 1984 [JP] Japan ............................ 59-76890

[51] Int. Cl.$^4$ .................. C08G 18/14; C08G 18/63; C08G 18/16; B29H 7/20
[52] U.S. Cl. .................................. 521/137; 264/54; 264/328.2; 264/331.12; 264/331.19; 521/124; 521/125; 521/126; 521/128; 521/129; 521/131; 521/902; 528/48; 528/51; 528/53; 528/54; 528/55; 528/57; 528/58; 528/73; 528/75
[58] Field of Search ............... 521/137, 124, 125, 126, 521/128, 129, 131, 902; 528/48, 51, 53, 54, 55, 57, 58, 73, 75; 264/54, 328.2, 331.12, 331.19

[56] References Cited

U.S. PATENT DOCUMENTS 3,823,201 7/1974 Pizzini et al. ..................... 260/861
4,314,038 2/1982 Markovs ............................ 521/173
4,404,324 9/1983 Fock et al. ........................ 528/73
4,429,076 1/1984 Saito et al. ....................... 525/63

OTHER PUBLICATIONS

Kuryla et al, "Polymer/Polyols, a New Class of Polyurethane Intermediates", Journal of Cellular Plastics, Mar., 1965, pp. 84–96.

Primary Examiner—Herbert S. Cockeram
Attorney, Agent, or Firm—Oblon, Fisher Spivak, McClelland & Maier

[57] ABSTRACT

Polyurethane resins having high rigidity and improved physical properties such as mechanical strengths and heat resistance are obtained by reacting a polyisocyanate with a polymer polyol derived from an epoxy-containing monomer, for example, glycidyl esters of unsaturated mono- and dicarboxylic acids, and a polyol, and bringing about ring-opening reaction of epoxy radicals in the presence of an epoxy curing agent, simultaneously with, or before or after the urethane-forming reaction.

33 Claims, No Drawings

POLYURETHANE BASED ON EPOXY-CONTAINING POLYMER POLYOL AND PROCESS FOR MAKING THE SAME

BACKGROUND OF THE INVENTION

1. Field of the Invention

This invention relates to polyurethanes. More particularly, it relates to polyurethanes having improved physical properties, and process for making the same.

2. Description of the Prior Art

It is well known that polyurethane foams and elastomers having load-bearing properties can be obtained polymer polyols, which are prepared in general by polymerization of one or more ethylenically unsaturated monomers (such as acrylonitrile and combination thereof with styrene) in situ in polyols and have polymer content of 20-30% by weight. A few documents disclose epoxy-containing polymer polyols having a polymer content of about 20% by weight, but polyurethanes prepared from them have physical properties not so good as those prepared from polymer polyols of acrylonitrile alone.

SUMMARY OF THE INVENTION

Accordingly, it is an object of the present invention to provide a polyurethane having high rigidity and improved physical properties.

It is another object of this invention to provide a polyurethane having improved heat resistance, impact resistance and other mechanical strengths.

It is yet another object of the invention to provide a process for producing a high-rigidity polyurethane, particularly suitable for Reaction Injection Molding (hereinafter referred to as RIM) method.

Briefly, these and other objects of the invention as hereinafter will become more readily apparent have been attained broadly by a process for producing a polyurethane, which comprises reacting at least one organic polyisocyanate with a polyol component, at least a part of which is an epoxy-containing polymer polyol, to form urethane linkages; and bringing about ring-opening reaction of epoxy radicals in the presence of an epoxy curing agent, simultaneously with, before or after the urethane-forming reaction.

DETAILED DESCRIPTION OF THE PREFERRED EMBODIMENTS

The epoxy-containing polymer polyol, used for producing polyurethanes according to the present invention, can be derived from at least one ethylenically unsaturated monomer comprising an epoxy-radical-containing monomer and at least one polyol.

There may be used any polymerizable monomer containing an epoxy radical, which can react with an epoxy curing agent to open the epoxy ring. Suitable epoxy radical-containing monomers include, for example, unsaturated hydrocarbon oxides; and unsaturated ethers, esters, urethanes, amides, acetals and the like, containing one or more epoxy radicals such as 1,2-, 1,3-, 1,4- and 1,5-epoxides.

Suitable examples of hydrocarbon oxides are butadiene monooxide, 1-vinyl cyclohexane-3,4-epoxide, and the like. Illustrative of such ethers are unsaturated ethers, including vinyl ethers, (meth)allyl ethers (allyl ethers and methallyl ethers; similar expressions are used hereinafter) and the like, of epoxy-containing alcohols, such as glycidol, tetrahydrofurfuryl alcohol, tetrahydrofuran dimethanol and the like as well as $C_2$–$C_4$ alkylene oxide (hereinafter referred to as AO) adducts of these alcohols; for example, glycidyl ethers, such as vinyl glycidyl ether, (meth)allyl glycidyl ethers, vinyloxyalkyl($C_2$–$C_4$)glycidyl ethers, (meth)allyloxyalkyl glycidyl ethers and the like; and tetrahydrofuran (hereinafter referred to as THF) ring-containing unsaturated ethers, such as vinyl tetrahydrofurfuryl ether, (meth)allyl tetrahydrofurfuryl ethers, corresponding unsaturated mono- and di-ethers of 2,5-THF dimethanol, corresponding unsaturated ethers of mono-tetrahydrofurfuryl ethers of glycols (as described hereinafter, such as ethylene glycol), corresponding unsaturated ethers of tetrahydrofurfuryloxymethanol, and the like. Suitable unsaturated esters include esters of epoxy-containing alcohols as mentioned above with ethylenically unsaturated mono- and poly-carboxylic acids, such as (meth)acrylic, crotonic, cinnamic, vinyl benzoic, maleic, fumaric, itaconic, citraconic, mesaconic and methyl malonic acids: for example, glycidyl esters, such as glycidyl-(meth)acrylates, crotonate, cinnamate and vinyl benzoate, diglycidyl- and monoalkyl($C_1$–$C_{18}$)monoglycidyl-maleates, fumarates, itaconates, citraconates, mesaconates and methyl malonates; corresponding tetrahydrofurfuryl esters; corresponding esters of AO adducts of glycidol and tetrahydrofurfuryl alcohol; and corresponding mono- and di-esters of 2,5-THF dimethanol and AO adducts thereof. Other examples of suitable esters are esters of ethylenically unsaturated alcohols, such as (meth)allyl alcohols and AO adducts thereof, with epoxy-containing carboxylic acids, such as glycidic, 2,3-epoxybutyric, 2,3-epoxy-2-methylbutyric, 2,3-epoxy-3-methylbutyric, epoxysuccinic and THF-2-carboxylic acids; and mixed esters of epoxy-containing alcohols as described above and unsaturated alcohols as above with polycarboxylic acids, including $C_2$–$C_{10}$ aliphatic and aromatic dicarboxylic acids, such as adipic, azelaic and sebacic acids, and phthalic acids. Exemplary of unsaturated urethanes and amides are those obtainable by reacting active hydrogen atom-containing epoxy compounds, such as epoxy-containing alcohols and carboxylic acids as mentioned above and AO adducts of these, and active hydrogen atom-containing unsaturated compounds, such as unsaturated alcohols and carboxylic acids as above and AO adducts of these acids, with organic polyisocyanates, such as aromatic, aliphatic, alicyclic and araliphatic diisocyanates as described below (tolylene diisocyanate and the like) as well as NCO-terminated prepolymers derived therefrom. Examples of acetals include hemiacetals and acetals of epoxy-containing aldehydes, such as tetrahydrofurfural, with unsaturated alcohols, such as (meth)allyl alcohols; acetals of epoxy-containing aldehydes as above with unsaturated alcohols as above and saturated monohydric alcohols, including aliphatic alcohols ($C_1$–$C_{18}$) such as methanol; and acetals of epoxy-containing aldehydes as above and unsaturated aldehydes, such as acrolein, crotonaldehyde and the like, with polyhydric alcohols, as described below, such as pentaerythritol, and the like. These epoxy-containing monomers may be employed solely or as a mixture of two or more of them.

Among these monomers, preferred are unsaturated carboxylic esters, particularly (meth)acrylates, of epoxy-containing alcohols, especially glycidol and tetrahydrofurfuryl alcohol. More preferred are glycidyl(- meth)acrylates, and the most preferred is glycidyl methacrylate.

Epoxy-containing monomer or monomers (A) can be used together with one or more other monomers.

Suitable examples of such monomers are ethylenically unsaturated nitriles (B), such as (meth)acrylonitriles; and the other ethylenically unsaturated monomers (C), for example, hydrocarbon monomers, such as butadiene, isoprene, 1,4-pentadiene, 1,6-hexadiene, 1,7-octadiene, styrene, alphamethylstyrene, methylstyrene, 2,4-dimethylstyrene, ethylstyrenes, isopropylstyrenes, butylstyrenes, phenylstyrenes, cyclohexylstyrenes, benzylstyrenes, vinylnaphthalenes, and the like; substituted styrenes, such as cyanostyrenes, nitrostyrenes, N,N-dimethylaminostyrenes, acetoxystyrenes, methyl 4-vinylbenzoate, phenoxystyrenes, p-vinyl diphenyl sulfide, p-vinylphenyl phenyl oxide, chlorostyrenes, 2,5-dichlorostyrenes, bromostyrenes, fluorostyrenes, trifluoromethylstyrenes, iodostyrenes, and the like; acrylic and substituted acrylic monomers, such as (meth)acrylic acids, methyl(meth)acrylates, ethyl(meth)acrylates, 2-hydroxyethyl(meth)acrylates, cyclohexyl(meth)acrylates, benzyl(meth)acrylates, isopropyl(meth)acrylates, octyl(methyl)acrylates, methyl alpha-chloroacrylate, ethyl alpha-ethoxyacrylate, methyl alpha-acetamidoacrylate, butyl(meth)acrylates, 2-ethylhexyl(meth)acrylates, phenyl(meth)acrylates, alpha-chloroacrylonitrile, N,N-dimethylacrylamide, N,N-dibenzylacrylamide, N-butylacrylamide, (meth)acryl formamide, and the like; vinyl esters, vinyl ethers, vinyl ketones, etc, such as vinyl acetate, vinyl chloroacetate, vinyl butyrate, isopropenyl acetate, vinyl formate, vinyl(meth)acrylates, vinyl methoxy acetate, vinyl benzoate, vinyl chloride, vinyl iodide, vinylbromide, vinyl fluoride, vinylidene chloride, vinylidene bromide, vinylidene fluoride, 1-chloro-1-fluoroethylene, vinyl alcohol, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 2-butoxy-2'-vinyloxy diethyl ether, 3,4-dihydro-1,2-pyran, vinyl 2-ethylmercaptoethyl ether, vinyl methyl ketone, vinyl ethyl ketone, vinyl phenyl ketone, vinyl ethylsulfide, vinyl ethyl sulfone, N-methyl-N-vinyl acetamide, N-vinylpyrrolidone, vinylimidazole, divinyl sulfide, divinyl sulfoxide, divinyl sulfone, sodium vinyl sulfonate, methyl vinyl sulfonate, N-vinyl pyrrole, vinyl pyridines, and the like; dimethyl fumarate, dimethyl maleate, maleic acid, crotonic acid, fumaric acid, itaconic acid, monomethyl itaconate, t-butylaminoethyl(meth)acrylates, dimethylaminoethyl(meth)acrylates, (meth)allyl alcohols, glycol monoesters of itaconic acid, dichlorobutadiene, and so on.

Among these monomers, preferred are (meth)acrylonitriles, vinyl aryl monomers (especially styrene and alphamethylstyrene) and alkyl alkenoate (especially methyl and ethyl(meth)acrylates). More preferred are (meth)acrylonitriles (particularly acrylonitrile) (B) and combinations of (B) with the other monomers (C) (particularly methyl methacrylate and styrene).

The amount of said epoxy-containing monomer (A) is usually at least 3%, preferably 5–95%, more preferably 15–90%, based on the weight of the total monomers. The amount of said unsaturated nitrile (B) is preferably 5–95%, more preferably 10–85%; and the amount of the other monomer (C) is usually 0–60%, preferably 0–40%, based on the weight of the total monomers.

Suitable polyols employed for producing epoxy-containing polymer polyols include, for example, polyether polyols, polyester polyols, and mixtures of them, both of which polyols are usually used as raw materials for producing polyurethanes.

Illustrative of such polyether polyols are alkylene oxide adducts of compounds containing at least two active hydrogen atoms, such as polyhydric alcohols, polyhydric phenols, amines, polycarboxylic acids, phosphorous acids, and the like. Suitable examples of polyhydric alcohols include diols, such as ethylene glycol, propyrene glycols, 1,3- and 1,4-butane diols, 1,6-hexane diol, neopentyl glycol, diethylene glycol, bis(hydroxymethyl)cyclohexane, bis(hydroxyethyl)benzene, and the like; and polyols having 3–8 or more hydroxyl groups, such as glycerol, trimethylolpropane, trimethylolethane, hexane triol, pentaerythritol, diglycerol, alpha-methylglycoside, sorbitol, xylitol, mannitol, glycose, fructose, sucrose, and the like. Exemplary of suitable polyhydric phenols are mono- and poly-nuclear phenols, such as hydroquinone, catechol, resorcin, pyrogallol, and bisphenols (bisphenol A, bisphenol F, bisphenol sulfon, and the like), as well as phenol-formaldehyde condensation products. Suitable amines are inclusive of ammonia; alkanol amines, such as mono-, di- and tri-ethanol amines, isopropanol amines, and the like; aliphatic, aromatic, araliphatic and alicyclic monoamines, such as C 1–20 alkyl amines (methyl, ethyl, isopropyl, butyl, lauryl and octyl amines), aniline, toluidine, naphthyl amines, benzyl amine, cyclohexyl amine, and the like; aliphatic polyamines, such as C 2–6 alkylene diamines (ethylene diamine), diethylene triamine, and the like; aromatic polyamines, such as tolylenediamines, phenylenediamines, xylylenediamines, methylenedianiline, diphenyletherdiamine, and the like; alicyclic polyamines, such as isophoronediamine, cyclohexylenediamine, dicyclohexylmethanediamine, and the like; and heterocyclic polyamines, such as piperazine, N-aminoethylpiperazine and other heterocyclic polyamines described in Japan Patent Publication No. 21044/1980.

Suitable alkylene oxides, employed for producing polyether polyols, include, for example, ethylene oxide, propylene oxide, 1,2-, 2,3-, 1,3- and 1,4-butylene oxides, styrene oxide, epichlorohydrin and the like, as well as combinations of two or more of them. Among them, preferred are propylene oxide and combination of propylene oxide and ethylene oxide (weight ratio: usually 30/70–100/0, preferably 70/30–95/5). Addition of alkylene oxides to active hydrogen atom-containing compounds can be carried out in the usual way, with or without catalysts (such as alkaline catalysts, amine catalysts and acidic catalysts), under normal or elevated pressure, in a single step or multi-stages. Addition of different alkylene oxides (propylene oxide and ethylene oxide) may be performed by random-addition, block-addition or combination of them (for instance, random-addition followed by tipping).

Suitable polyester polyols are inclusive of condensation products of dihydric or trihydric alcohols (such as ethylene glycol, propylene glycols, 1,3- and 1,4-butane diols, neopentyl glycol, 1,6-hexane diol, glycerol, trimethylolpropane, and the like) and/or polyether polyols (such as those described above) with dicarboxylic acids (aliphatic or aromatic dicarboxylic acids, such as glutaric, adipic, sebacic, fumaric, maleic, phthalic and terephthalic acids) or ester-forming derivatives thereof (anhydrides and lower alkyl esters, such as maleic and phthalic anhydrides, dimethyl terephthalate, and the like); and ring-opening polymerization products of lactones (such as epsilon-caprolactone).

These polyols, used for producing epoxy-containing polymer polyols, have usually 2-8 hydroxyl groups, preferably 2-4 hydroxyl groups, and have OH equivalent weight of usually 200-4,000, preferably 400-3,000.

Among these polyols, polyether polyols are preferred to polyester polyols. Preferable polyether polyols are ones containing up to 30% by weight of tipped oxyethylene units at the molecular end and 0-50% by weight of randomly distributed oxyethylene units in the molecule. More preferred are ones containing 5-25% by weight of tipped oxyethylene units and 5-40% by weight of randomly distributed oxyethylene units. Content of the primary hydroxyl groups of polyether polyols is preferably at least 30%, more preferably at least 50%, most preferably at least 70%.

Urethane polyols (OH-terminated urethane prepolymers) prepared from organic polyisocyanates and excess of polyols, and modified polyols containing polymerizable unsaturated bonds in the molecules may also be employed for producing epoxy-containing polymer polyols in accordance with this invention.

Furthermore, desired epoxy-containing polymer polyols can be produced by polymerizing monomers (for example, said monomer (A) and optionally said monomer (C)) in polymer polyols previously prepared by polymerization of monomers (for example, said monomer (B) and optionally said monomer (C)) in polyols.

In producing epoxy-containing polymer polyols, ratio of the total monomer to the polyol can be varied widely, and generally 10-400 parts, preferably 50-250 parts, more preferably 70-200 parts, most preferably 85-150 parts of the monomer (or polymer) are used for each 100 parts by weight of the polyol. (In case where polymer polyol is used as the starting polyol, the amount of the monomer in the above include that contained in the polymer portion of the polymer polyol.)

Preparation of polymer polyols from polyols and monomers can be carried out in the usual way, for example, by polymerizing monomers in polyols in the presence of polymerization initiators (such as radical generators), as described in U.S. Pat. No. 3,383,351 and Japan Patent Lay-open No. 15,894/1975; or by grafting polymers, prepared from monomers beforehand, to polyols in the presence of radical generators, as described in Japan Patent Publication No. 47,597/1972. Preferred is the former method.

Illustrative of suitable polymerization initiators are free radical generators, for example, azo compounds, such as 2,2'-azobisisobutyronitrile (hereinafter referred to as AIBN), 2,2'-azobis(2,4-dimethylvaleronitrile), and the like; peroxides, such as methyl isobutyl ketone peroxide, dibenzoil peroxide, lauroyl peroxide, di-t-butyl peroxide, dicumyl peroxide, t-butyl hydroperoxide, di-isopropyl peroxydicarbonate, t-butyl peroxyisopropylcarbonate, t-butyl peroxy(2-ethylhexanoate), t-butyl peroxypivalate, 2,5-dimethylhexane-2,5-diper-2-ethylhexoate, t-butyl percrotonate, t-butyl perisobutylate, di-t-butyl perphthalate, 1,1-di-t-butyl peroxy-3,3,5-trimethylcyclohexane, and the like; persulfates, perborates, persuccinates and so on. Among these, preferred are azo compounds (especially AIBN) from a practical point of view. The amount of polymerization initiator is usually 0.1-20%, preferably 0.2-10% based on the total weight of monomers.

Free radical generation by physical methods, such as by ultraviolet-light irradiation and by electron beem irradiation, may also be employed.

Polymerization of monomers in polyols can be performed without any solvents, but it is preferred to carry out in the presence of solvent in case of producing polymer polyols of higher polymer content. Suitable solvents include, for example, benzene, toluene, xylene, acetonitrile, ethyl acetate, hexane, heptane, dioxane, N,N-dimethylforamide, N,N-dimethylacetoamide, isopropyl alcohol, n-butanol, and the like.

Polymerization may also be carried out in the presence of known chain transfer agents other than alkyl mercaptanes, if necessary. Illustrative of suitable chain transfer agents are carbon tetrachloride, carbon tetrabromide, chloroform, and enolethers as described in Japan Patent Lay-open No. 31,880/1980.

Polymerization is carried out at temperature above the decomposition temperature of the polymerization initiator, usually at 60°-180° C., preferably at 90°-160° C., more preferably at 100°-150° C., under atmospheric pressure, under pressure or under reduced pressure. Polymerization may be done continuously or batchwise.

Polymer polyols obtained after polymerization may be used as raw materials for polyurethane, as such without any after-treatment; but it is desirable to remove impurities such as organic solvents, decomposition products of polymerization initiators, unreacted monomers, and so on, by conventional means.

Epoxy-containing polymer polyols thus obtained are translucent or opaque, white or brownish yellow dispersions, in which all the monomers polymerized, namely, polymers are stably dispersed in polyols. Polymer content of said polymer polyols is generally 10-80%, preferably 30-70%, more preferably 40-65%, most preferably 45-60% by weight. Hydroxyl value of epoxy-containing polymer polyols is generally 3-150, preferably 4-125, more preferably 5-50.

In producing polyurethanes according to the present invention, epoxy-containing polymer polyol can be used in conjunction with one or more other polyols, if desired. Illustrative of such polyols are high molecular weight polyols containing at least two hydroxyl groups and having OH equivalent weight of 200-4,000, for example, the same ones as described as the raw materials for epoxy-containing polymer polyols, namely, polyether polyols, polyester polyols, urethane polyols, vinyl-modified polyols and epoxy-free polymer polyols; as well as polyols from natural oils such as castor oil. Among these polyols, preferred are polyether polyols and polymer polyols therefrom. More preferred are polyether polyols, having OH equivalent weight of 200-4,000 (particularly 400-3,000), obtained by addition of one or more C 2-4 alkylene oxide (especially propylene oxide or combination thereof with ethylene oxide) to compounds containing 2-8 (particularly 2-4) active hydrogen atoms, and polymer polyols therefrom, produced by polymerizing said monomer (B) (especially acrylonitrile) or combination thereof with said monomer (C) (especially styrene and methyl methacrylate) in situ in the above polyether polyols.

These high molecular weight polyols are used in an amount of usually 0-500 parts, preferably 0-300 parts, more preferably 0-200 parts by weight per 100 parts by weight of epoxy-containing polymer polyols.

In this invention, there may be used to react with organic polyisocyanates high molecular weight or low molecular weight active hydrogen atom-containing compounds other than epoxy-containing polymer polyols and high molecular weight polyols descrived above.

Examples of such high molecular weight active hydrogen atom-containing compounds are polyether polyamines, having equivalent weight of 200–4,000 and containing at least two active hydrogen atom-containing groups mainly consisting of amino groups as the terminal groups, produced by reacting ammonia with polyether polyols under high pressure.

Suitable low molecular weight active hydrogen atom-containing compounds include compounds containing at least two (preferably 2–5) active hydrogen atoms and having equivalent weight (molecular weight per active hydrogen atom-containing group) of at least 30 and less than 200, which compounds are generally called crosslinkers or chain-extenders. IIllustrative examples are dihydric and trihydric alcohols, such as ethylene glycol, propylene glycols, 1,3- and 1,4-butane diols, 1,6-hexane diol, glycerol, trimethylolpropane, and the like; amines, such as mono-, di- and tri-ethanol amines and isopropanol amines, tolylenediamines, diethyl tolylenediamines, methylenedianiline, methylenebis(o-chloroaniline), and the like; and polyhydroxyl compounds having equivalent weight of less than 200, obtainable by adding lower amount of one or more alkylene oxides (such as ethylene oxide and/or propylene oxide) to active hydrogen atom-containing compounds, such as dihydric and trihydric alcohols as mentioned above, polyhydric alcohols containing 4–8 hydroxyl groups (such as pentaerythritol, methylglucoside, sorbitol, sucrose and the like), polyhydric phenols (bisphenol A, hydroquinone, and the like), amines as described above, and other amines than above (such as ethylene diamine, diethylene triamine; aminoethylpirerazine, aniline, and the like. Low molecular weight active hydrogen atom-containing compounds can be used generally in an amount of 0–100 parts, preferably 0–50 parts, more preferably 0–30 parts by weight per 100 parts by weight of high molecular weight polyols including epoxy-containing polymer polyols.

Ratio of epoxy-containing polymer polyols in the whole active hydrogen atom containing compounds is usually 20–100% by weight. Content of polymer moiety (derived from ethylenically unsaturated monomers) of said polymer polyols in the whole active hydrogen atom-containing compounds is generally 5–80% by weight.

In producing polyurethanes according to the invention, there can be used any of organic polyisocyanates conventionally employed for production of polyurethanes. Suitable polyisocyanates include, for example, aromatic polyisocyanates containing 6–20 carbon atoms (except carbon atoms in NCO groups), such as 1,3- and 1,4-phenylenediisocyanates, 2,4- and 2,6-tolylenediisocyanates (TDI), diphenylmethane-2,4'- and 4,4'-diisocyanates (MDI), naphthalene-1,5-diisocyanate, triphenylmethane-4,4',4''-trisocyanate, polymethylenepolyphenylenepolyisocyanates (PAPI) obtained by phosgenation of aniline-formaldehyde condensate products, m- and p-isocyanato-phenyl sulfonyl isocyanate, and the like; aliphatic polyisocyanates containing 2–18 carbon atoms, such as ethylenediisocyanate, tetramethylenediisocyanate, hexamethylenediisocyanate, dodecamethylenediisocyanate, 1,6,11-undecane-triisocyanate, 2,2,4-trimethylhexanediisocyanate, lysine diisocyanate, 2,6-diisocyanato-methyl caproate, bis(2-isocyanato-ethyl)fumarate, bis(2-isocyanato-ethyl)carbonate, 2-isocyanato-ethyl 2,6-diisocyanato-hexanoate, and the like; alicyclic polyisocyanates containing 4–15 carbon atoms, such as isophorone diisocyanate, dicyclohexylmethane diisocyanates, cyclohexylene diisocyanates, methylcyclohexylene diisocyanates, bis(2-isocyanato-ethyl)4-cyclohexene-1,2-dicarboxylate, and the like; araliphatic polyisocyanates containing 8–15 carbon atoms, such as xylylene diisocyanate, diethylbenzene diisocyanate, and the like; and modified polyisocyanates of these polyisocyanates, containing urethane, carbodiimide, allophanate, urea, biuret, urethdione, urethimine, isocyanurate and/or oxazolidone groups, such as urethane-modified TDI, carbodiimide-modified MDI, urethane-modified MDI, and the like; as well as mixtures of two or more of them. Among these polyisocyanates, preferred are TDI (including 2,4- and 2,6-isomers, mixtures of them and crude TDI) and MDI (including 4,4'- and 2,4'-isomers, mixtures of them and crude MDI or PAPI), and modified polyisocyanates containing urethane, carbodiimide, allophanate, urea, biuret and/or isocyanurate groups, derived from TDI and/or MDI.

In producing polyurethanes according to this invention, it is essential to use epoxy-curing agent for ring-opening reaction of epoxy radicals. In this invention, can be used any of curing agents, generally employed for curing of conventional epoxy resins, for example, such as agents as described in "EPOXY RESINS" (published Sept.30,1970 by Shokodo, Japan), pages 109–149; "KUNSTSTOFF-HANDBUCH, Band XI, Polyacetale, Epoxidharze, fluorhaltige Polymerisate, Silicone usw." (published 1971 by Carl Hanser Verlag, München),pages 106–120; and "EPOXY RESINS AND PRODUCTS, Recent Advance" (published 1977 by Noyes Data Corporation, U.S.A.), pages 301–347.

Suitable curing agents are inclusive of polyamines, for example, aliphatic polyamines, containing 2–18 carbon atoms, including alkylene($C_2$–$C_6$)diamines, such as ethylene diamine, tetramethylene diamine, hexamethylene diamine and the like, polyalkylene($C_2$–$C_6$)polyamines, such as diethylene triamine, iminobispropylamine, bis(hexamethylene)triamine, triethylene tetramine, tetraethylene pentamine, pentaethylene hexamine and the like, and alkyl($C_1$–$C_4$)-substituted or hydroxyalkyl ($C_2$–$C_4$)-substituted products of these amines, such as dialkyl ($C_1$–$C_3$)aminopropyl amine, aminoethyl ethanol amine, methyliminobispropylamine and the like, alicyclic or heterocyclic ring-containing aliphatic polyamines, such as 3,9-bis(3-aminopropyl)-2,4,8,10-tetraoxaspiro(5,5)undecane, and the like; alicyclic or heterocyclic polyamines, containing 4–15 carbon atoms, such as methane diamine, N-aminoethylpiperazine, 1,3-diaminocyclohexane, isophorone diamine, dicyclohexylmethane diamine, and the like; araliphatic polyamines, containing 8–15 carbon atoms, such as xylylene diamines, tetrachloro-p-xylylene diamine, and the like; aromatic polyamines, such as phenylene diamines, tolylene diamines, methylene dianilines, diaminodiphenyl sulfones, benzidine, 4,4'-bis(o-toluidine), thiodianiline, methylene bis(o-chloroaniline), bis(3,4-diaminophenyl)-sulfone, diaminoditolyl sulfones, 2,6-diamino pyridine, 4-chloro-o-phenylene diamine, 4-methoxy-6-methyl-m-phenylene diamine, m-aminobenzyl amine, 4,4'-diamino-3,3'-dimethyl diphenylmethane, diethyl tolylene diamines, alkyl($C_1$–$C_4$)3,5-diamino-4-chloro-benzoates, and the like; polyamide polyamines, such as condensation products of amines as above with polymerized fatty acids (such as dimer acid); polyether polyamines, described above as said high molecular weight active hydrogen atom-containing compounds; dicyandiamides; and so on.

Other examples of suitable curing agents are polycarboxylic acids, containing 4–30 carbon atoms, succinic, maleic, itaconic, azelaic, sebacic, phthalic, tetrahydrophthalic, methyltetrahydrophthalic, hexahydrophthalic, methylhexahydrophthalic, nadic, methylnadic, dodecenyl succinic, pyromellitic, trimellitic, chlorendic, mellophanic, benzophenone tetracarboxylic and cyclopentadiene tetracarboxylic acids, phenylene-bis(3-butane-1,2-dicarboxylic acid), and the like, as well as anhydrides of these acids; and Lewis acids, such as $BF_3$, $FeCl_3$, $AlCl_3$, $SnCl_4$, $ZnCl_2$, aluminum alkoxides, boron trifluoride-amine complexes, and the like.

Organic polyisocyanates, described above as the raw materials of polyurethanes, are also suitable epoxy curing agents in this invention.

Polysulfide resins and other known epoxy curing agents may also be used in the invention.

Among these epoxy curing agents, preferred are organic polyisocyanates, acid anhydrides and polyamines. More preferred are organic polyisocyanates and acid anhydrides, particularly the formers. Among organic polyisocyanates, preferred are aromatic polyisocyanates, such as TDI and MDI and modified products of them. MDI and modified polyisocyanates thereof, especially the latters, are the most preferred. Among acid anhydrides, preferred are liquid ones, particularly hydrogenated phthalic anhydrides and methyl-substituted hydrogenated phthalic anhydrides. Among polyamines, preferred are aromatic polyamines, such as alkyl($C_1$-$C_4$)4-chloro-3,5-diamino-benzoates, methylene dianilines and diethyl tolylene diamines.

The amount of epoxy curing agent is not critical and will depend on the nature of said agent and epoxy-containing polymer polyol. Generally 0.5–200 parts, preferably 1–100 parts by weight of said agent (usually 0.5–20 parts, preferably 1–10 parts by weight, in case of Lewis acid) can be used per 100 parts of epoxy-containing polymer polyol.

In producing polyurethanes according to this invention, there may be used, if necessary, any known materials, such as blowing agent, catalyst, accelerator and other auxiliaries, usually employed in producing polyurethanes or in curing epoxy resins.

(1) Illustrative of suitable blowing agents are halogenated hydrocarbons, such as methylene chloride, chloroform, ethylidene dichloride, vinylidene chloride, trichlorofluoromethane, dichlorofluoromethane, and the like; low-boiling hydrocarbons, such as butane, hexane, heptane, and the like; volatile organic solvents without halogen, such as acetone, ethyl acetate, diethylether, and the like; reactive blowing agents, such as water, which generates carbon dioxide by reaction with polyisocyanate, and the like; and combinations of two or more of them. The amount of blowing agent can be varied according to the desired density of polyurethanes, which may vary widely, for instance, from 0.01 to 1.4 $g/cm^3$.

(2) Examples of suitable catalysts, which catalyze reactions of NCO group with active hydrogen atom-containing groups (OH, $NH_2$, NH and the like) and/or between NCO groups each other, are amine catalysts, including tertiary amines, secondary amines, alkanolamines and quaternary ammonium hydroxides, for example, triethylamine, tributylamine, N-methylmorpholine, N-ethylmorpholine, N,N,N',N'-tetramethylethylenediamine, pentamethyldiethylenetriamine, triethylenediamine, N-methyl-N'-dimethylaminoethyl-piperazine, N,N-dimethylbenzylamine, N,N-dimethylcyclohexylamine, N,N,N',N''-tetramethyl-1,3-butanediamine, 1,2-dimethylimidazole, dimethylamine, N-methyldiethanolamine, N-ethyldiethanolamine, N,N-dimethylethanolamine, N,N-diethylethanolamine, tetraalkylammonium hydroxides (such as tetramethylammonium hydroxide), aralkyltrialkylammonium hydroxides (such as benzyltrimethylammonium hydroxide), and the like; alkaline catalysts, including phenoxides, hydroxides, alkoxides and carboxylates of alkali metals (such as sodium and potassium), for example, sodium phenolate, potassium hydroxide, sodium methoxide, potassium acetate, sodium acetate, potassium 2-ethylhexanoate, and the like; phosphines, such as triethylphosphine, and the like; metal chelate compounds, such as potassium-salicylaldehyde complex, and the like; organo tin compounds, including $Sn^{II}$ and $Sn^{IV}$ compounds, such as stannous acetate, stannous octoate(stannous 2-ethylhexoate), dibutyltin oxide, dibutyltin dichloride, dibutyltin diacetate, dibutyltin dilaurate, dibutyltin maleate, dioctyltin diacetate, and the like; other organo metal compounds, such as dialkyl titanate, lead naphthenate, and so on. Catalysts for trimerization of NCO groups forming isocyanurate ring, such as tris(dimethylaminomethyl)phenol, N,N',N''-tris(dimethylaminopropyl)hexahydro-s-triazine, and the like, may also be used. These catalysts are used in small amounts, for instance, from about 0.001 to about 5% based on the weight of the reaction mixture.

(3) Suitable epoxy curing accelerators, which accelerate ring-opening reaction, especially ring-opening crosslinking reaction, include, for example, amines, such as pyridine, quinoline, imidazole, N,N-dimethylcyclohexylamine, triethylamine, N-ethylmorpholine, triethylenediamine, N,N-dimethylaniline, N,N-dimethylbenzylamine, tris(N,N-dimethylaminomethyl)phenol, and the like; basic alkali metal compounds, such as sodium methoxide, potassium hydroxide, potassium 2-ethylhexanoate, and the like; metal halides, such as $SnCl_4$, $FeCl_3$, $AlCl_3$, $SbCl_5$, $ZnCl_2$, $ZnBr_2$, KI, LiCl, and the like; organo metal compounds, such as triethyl aluminum, aluminum iso-propoxide, tetraisopropyl titanate, diethyl zinc, n-butoxy lithium, zinc acetate, lead 2-ethylhexanoate, acetylacetonates of metals (such as Fe and Co), and the like; quaternary ammonium compounds, such as tetramethylammonium chloride, tetramethylammonium bromide, trimethylbenzylammonium chloride, tetramethylammonium hydroxide, and the like; phosphorus compounds and boron compounds, such as trialkylphosphines, trialkylphosphine oxides, phosphonium salts, trialkyl borates, triaryl borates, tricycloalkyl borates, and the like. These accelerators can be used alone or as mixtures and selected suitably in accordance with the sorts of epoxy curing agents. The amount of accelerator is usually 0.01–20%, preferably 0.1–10% based on the weight of epoxy-containing polymer polyol.

(4) Exemplary of other auxiliaries are surfactants, as emulsifiers and foam stabilizers, particlarly silicone surfactants (polysiloxane-polyoxyalkylene copolymers) being important. Conventional epoxy resins, such as polyepoxides of bisphenol A type, of novolak type and of polyether type, and the like, may be added in minor amount, for example, up to 30% based on the weight of epoxy-containing polymer polyol. Illustrative of other known additives are flame retardants (such as phosphorus compounds, halogen compounds, Sb$_2$O$_3$ and the like), retarders (such as acidic compounds), colorants (pigments and dyes), internal mold release agents (such as hydrocarbon waxes), age resistors, antioxidants, plasticizers, germicides, and fillers, such as carbon black, titanium dioxide, diatomaceus earth, glass fiber, shattered glass fiber, talc, mica, silica, sand, aluminum powder, graphite, asbestos, and the like.

In this invention, polyisocyanate, which is reacted with active hydrogen atom-containing component to form polyurethane, is used in such an amount to provide NCO index of usually 80-120, preferably 100-110. But, apparent NCO index becomes different from the above range depending upon the kind of the epoxy curing agent. In case polyisocyanate is used for epoxy curing, equivalent ratio of NCO groups/(active hydrogen atom-containing groups+epoxy groups) is usually 0.7-1.3, preferably 0.8-1.2. When acid anhydride or polyamine is used as curative, ratio of (NCO equivalent+epoxy radical equivalent)/(active hydrogen atom-containing group equivalent+equivalent of the curative) is generally 0.7-1.3, preferably 0.8-1.2. Furthermore, drastically higher NCO index (for instance 300-1,000 or more) than the range stated above may be employed to introduce isocyanurate linkages into polyurethanes. (In this case, apparent NCO index and the above-mentioned equivalent ratio are increased in accordance with higher NCO index as above.)

In producing polyurethanes according to the invention, all or a part of epoxy radicals must be made to bring about ring-opening reaction, such as coupling or polymerization of epoxy radicals each other, reaction of epoxy radical with active hydrogen atom-containing compound, reaction with acid anhydride, reaction with polyisocyanate (formation of oxazolidone), or the like, in the presence of epoxy curing agent with or without epoxy curing accelerator. Ring-opening reaction may be brought about simultaneously with, before or after (preferably simultaneously with or after) the urethane forming reaction of polyisocyanate with polyol component comprising epoxy-containing polymer polyol. It is preferred to form crosslinking by ring-opening reaction of epoxy radicals, between polymer portions of epoxy-containing polymer polyols, and/or between polymer portion of epoxy-containing polymer polyol and polyurethane segment. It is characteristic of this invention to introduce crosslinked structure derived from epoxy radical into polyurethane, whereby can be produced polyurethanes having excellent rigidity as well as remarkably improved properties such as mechanical strength, heat resistance and impact resistance, as compared with polyurethanes obtained from conventional polymer polyols (such as those produced by polymerizing acrylonitrile or combination thereof with styrene). Degree of ring-opening of epoxy radicals may be varied within a wide range (for example 20-100%) depending on epoxy content of reaction mixture and desired properties of products. After ring-opening of epoxy radicals, an increase in flexural modulus of about 20%-about 200% or higher can be attained over before ring-opening.

Polyurethanes of this invention can be produced in known manners, including one-shot process, semi-prepolymer process and prepolymer process. Production of various non-cellular or cellular polyurethanes may be carried out in closed mold or open mold, usually by mixing raw materials with low-pressure or high-pressure mixing machine.

This invention is particularly useful for noncellular or microcellular polyurethane elastomers having a density of 0.8-1.4 g/cm$^3$, by RIM method, which elastomers are hereinafter referred to as RIM urethanes. Molding by RIM method can be carried out in the same conditions as conventional RIM method. For instance, raw materials (2-4 components), conditioned at a temperature of 25°-90° C. are intimately mixed in an impingement mixhead under a pressure of 100°-200 Kg/cm$^2$G and then injected into a closed mold preheated to a temperature of 30°-120° C. (preferably 60°-90° C.), followed by demolding within 0.1-5 minutes. After demolding, molded articles thus obtained may be further after-cured or annealed, for example, for 0.3-10 hours at temperatures of 100°-180° C., if necessary. Ring-opening of epoxy radical may be occurred during molding or during after-cure, or both.

The invention is also useful for producing high-resilient and firm, flexible and semi-rigid polyurethane foams, suitable for energy absorbers, or cushioning materials of automobils, furnitures and so on, and for producing cellular and non-cellular rigid polyurethanes, as well as for producing polyurethanes suitable for adhesives, coatings and the like.

It is one of advantages of the invention that extremely high-rigid polyurethanes having improved thermal resistance and impact resistance can be obtained easily at low cost. For example, there can be obtained, without adding any reinforcing glass fiber, RIM urethanes, which are equal in rigidities to reinforced RIM polyurethane elastomers (hereinafter referred to as R-RIM urethanes) containing added therein 20% by weight of glass fiber shatters. R-RIM urethanes have inevitable drawbacks such as wearing or damage of equipments through glass abrasion, bad influences of glass fiber upon paintability and appearance of surfaces of molded articles, and anisotropism immenant in molded articles; while RIM urethanes according to this invention are substantially free from such problems and consequently are particularly useful as exterior automotive trims, such as bumpers, fenders, door panels and outer bodies, and as housing of electrical apparatus or appliances.

Having generally described the invention, a more complete understanding can be obtained by reference to certain specific examples, which are included for purposes of illustration only and are not intended to be limiting unless otherwise specified. In the examples, % and parts designate % by weight and parts by weight, respectively.

Raw materials used in the following examples are as follows:

(1) Polyol A: A dihydric polyol (OH value: 56 mgKOH/g; degree of unsaturation: 0.02 meq/g), produced by adding 1,700 parts of propylene oxide (hereinafter referred to as PO) to 76 parts of propylene glycol followed by tipping 300 parts of ethylene oxide (hereinafter referred to as EO).

(2) Polyol B: A dihydric polyol (OH value: 28; unsaturation: 0.07), produced by successive addition of 2,000 parts of PO, 500 parts of EO, 2,000 parts of PO and then 700 parts of EO to 76 parts of propylene glycol.

(3) Polyol C: A trihydric polyol (OH value: 56; unsaturation: 0.02), produced by adding 3,000 parts of PO to 92 parts of glycerol.

(4) Polyol D: A trihydric polyol (OH value: 55; unsaturation: 0.02), produced by adding 2,700 parts of PO to 92 parts of glycerol followed by tipping 310 parts of EO.
(5) Polyol E: A trihydric polyol (OH value: 55; unsaturation: 0.02), produced by adding 2,300 parts of PO to 92 parts of glycerol followed by tipping 600 parts of EO.
(6) Polyol F: A mixture of 20 parts of Polyol C, 40 parts of Polyol D and 40 parts of Polyol E.
(7) Polyol G: A trihydric polyol (OH value: 33; unsaturation: 0.04), produced by adding 5,000 parts of PO to 92 parts of glycerol followed by tipping 800 parts of EO.
(8) Polyol H: A trihydric polyol (OH value: 28; unsaturation: 0.06), produced by adding a mixture of 5,100 parts of PO and 800 parts of EO to 92 parts of glycerol followed by tipping 1,000 parts of EO.
(9) Polyol J: A tetrahydric polyol (OH value: 36; unsaturation: 0.04), produced by successive addition of 400 patrs of EO, 6,000 parts of PO and then 700 parts of EO to 136 parts of pentaerythritol.
(10) Polyisocyanates
  (i) Coronate 1055: A carbodiimide-modified liquified MDI (NCO content: 28.8%), sold by Nippon Polyurethane Industries Co., Ltd.
  (ii) Millionate MR-200: a crude MDI (NCO content: 31%), sold by Nippon Polyurethane Industries Co., Ltd.
(11) Epoxy curing agents
  Curative A: $BF_3$ etherate.
  Curative B: Coronate 1055.
  Curative C: Methylhexahydrophthalic anhydride.
  Curative D:

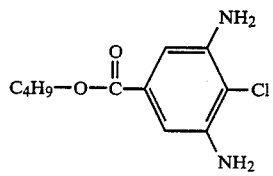

Curative E: $FeCl_3$.
(12) Foam stabilizers
  SRX-274C & SRX-294A: Polysiloxane-polyoxyalkylene block copolymers, sold by Toray Silicone Co.,Ltd.
  L-520 & L-5307: Polysiloxane-polyoxyalkylene block copolymers, sold by Nippon Unicar Co.,Ltd.
(13) Tin catalysts
  DBTDL: Dibutyltindilaurate.
  T-9: Stannous 2-ethylhexoate.
(14) Black toner: A toner prepared by incorporating 50% of carbon black into polyoxypropylene diol of MW 2,000.
(15) Amine catalysts
  DABCO 33LV: 33% solution of triethylene diamine in dipropylene glycol.
  DMEA: Dimethylethanolamine.
  TMED: Tetramethylethylenediamine.
  Niax A-1: An amine catalyst, sold by Union Carbide Corp.
(16) Shattered glass fiber
  FESS-0413: Chopped strand of glass fiber, sold by Fuji Fiber Glass Co.,Ltd.

EXAMPLE I

Into a reaction vessel equipped with two dropping equipments, a reflux condenser, a gas inlet tube, a temperature recorder and a stirrer, were charged 500 parts of Polyol A, and heated under nitrogen atmosphere to 120° C. A mixture of 520 parts of glycidyl methacrylate and 520 parts of acrylonitrile, and a dispersion of 10 parts of AIBN in 900 parts of Polyol A were concurrently added from the respective dropping equipments, within 4 hours, while maintaining the temperature at 120°–130° C. After stirring for additional 2 hours at 120° C., 2.5 parts of AIBN dispersed in 100 parts of Polyol A were added, followed by stirring for 2 hours at 120° C. Finally volatile matters were removed under reduced pressure to obtain a finely dispersed glossy polymer polyol.

EXAMPLE II

Into a reaction vessel equipped with a dropping equipment, a reflux condenser, a gas inlet tube, a temperature recorder and a stirrer, were charged 300 parts of xylene, and heated under nitrogen atmosphere to 120° C. A mixture of 900 parts of Polyol H, 832 parts of glycidyl methacrylate, 208 parts of acrylonitrile and 8 parts of AIBN was added within 4 hours, while maintaining the temperature at 120°–130° C. After stirring for additional 2 hours at 120° C., 2 parts of AIBN dispersed in 100 parts of Polyol H were added, followed by stirring for 2 hours at 120° C. Finally, volatile matters were removed under reduced pressure to obtain a finely dispersed glossy polymer polyol.

EXAMPLES III TO X

By the same manner as in Example II, various polymer polyols were prepared from the raw materials written in Table 1.

EXAMPLE XI

A mixture of 550 parts of Polyol H, tetrahydrofurfuryl methacrylate, 210 parts of acrylonitrile and 4 parts of AIBN was continuously fed with pump into an autoclave equipped with a stirrer and temperature control means, over 2 hours, while maintaining the temperature at 115°–120° C. After stirring for additional 30 minutes at the same temperature, 1 part of AIBN dispersed in 50 parts of Polyol H was added, followed by stirring for 30 minutes. Finally, volatile matters were removed under reduced pressure to obtain a pale yellowish brown finely dispersed polymer polyol.

EXAMPLES XII TO XX

By the same manner as in Example XI, various polymer polyols were prepared from the raw materials written in Table 2.

Properties of polymer polyols thus obtained are shown in Tables 1 and 2.

TABLE 1

| | Example No. | | | | | | | | | |
|---|---|---|---|---|---|---|---|---|---|---|
| | I | II | III | IV | V | VI | VII | VIII | IX | X |
| Raw materials, parts | | | | | | | | | | |
| Polyol | A1,500 | H1,000 | H1,000 | B1,000 | G1,000 | F1,000 | G1,000 | J1,000 | H1,000 | H1,000 |

TABLE 1-continued

| | Example No. | | | | | | | | | |
|---|---|---|---|---|---|---|---|---|---|---|
| | I | II | III | IV | V | VI | VII | VIII | IX | X |
| GA[1] | 520 | 832 | — | — | — | — | — | — | — | — |
| GMA[2] | — | — | 832 | 520 | 520 | 520 | 520 | 470 | 208 | 104 |
| AN[3] | 520 | 208 | 208 | 520 | 520 | 520 | 520 | 470 | 416 | 470 |
| MMA[4] | — | — | — | — | — | — | — | — | 416 | 470 |
| Styrene | — | — | — | — | — | — | — | 104 | — | — |
| AIBN | 10 + 2.5 | 8 + 2 | 8 + 2 | 8 + 2 | 8 + 2 | 8 + 2 | 8 + 2 | 8 + 2 | 8 + 2 | 8 + 2 |
| Xylene | — | 300 | 300 | 300 | 300 | 300 | 300 | 300 | 300 | 300 |
| Reaction Temperature, °C. | 120–130 | 120–130 | 120–130 | 120–130 | 120–130 | 130–140 | 110–120 | 110–120 | 120–130 | 100–110 |
| Polymer polyol | | | | | | | | | | |
| Dispersion state | stable | stable | stable | stable | stable | stable | stable | stable | stable | stable |
| Appearance[5] | PYB | PY | PYB | PYB | PYB | PYB | PYB | PYB | PYB | PYB |
| Polymer content, % | 40.4 | 50.4 | 50.6 | 50.2 | 50.1 | 50.3 | 50.5 | 50.3 | 50.6 | 50.5 |
| OH-value, mgKOH/g | 33.4 | 13.9 | 13.8 | 13.9 | 27.9 | 27.3 | 16.3 | 17.9 | 13.8 | 13.9 |
| Viscosity, cps/25° C. | 2,700 | 45,800 | 20,100 | 13,000 | 5,800 | 8,600 | 9,900 | 21,800 | 17,100 | 19,500 |

Notes:
[1]Glycidyl acrylate,
[2]Glycidyl methacrylate,
[3]Acrylonitrile,
[4]Methyl methacrylate;
[5]PYB:pale yellowish brown, PY:pale yellow.

TABLE 2

| | Example No. | | | | | | | | | |
|---|---|---|---|---|---|---|---|---|---|---|
| | XI | XII | XIII | XIV | XV | XVI | XVII | XVIII | XIX | XX |
| Raw materials, parts | | | | | | | | | | |
| Polyol | H 550 | H 650 | H 600 | B 500 | H 500 | H 400 | G 500 | F 500 | G 500 | H 550 |
| TMA[1] | 210 | 260 | 125 | 105 | 52 | 63 | 52 | 52 | 52 | — |
| TA[2] | — | — | — | — | — | — | — | — | — | 210 |
| AN[3] | 210 | 110 | 295 | 210 | 230 | 280 | 230 | 230 | 230 | 210 |
| MMA[4] | — | — | — | 210 | 230 | 280 | 230 | 230 | 230 | — |
| AIBN | 4 + 1 | 4.8 + 1.2 | 4.8 + 1.2 | 4 + 1 | 4 + 1 | 4 + 1 | 4 + 1 | 4 + 1 | 4 + 1 | 4 + 1 |
| Xylene | — | — | — | 150 | 150 | 150 | 150 | 150 | 150 | — |
| Reaction Temperature, °C. | 115–120 | 120–125 | 120–125 | 130–135 | 130–135 | 130–135 | 125–130 | 110–115 | 115–120 | 120–125 |
| Reaction Time, hrs. | 2 | 2 | 2 | 3 | 3 | 2 | 3 | 4 | 3 | 2 |
| Polymer polyol | | | | | | | | | | |
| Dispersion state | stable | stable | stable | stable | stable | stable | stable | stable | stable | stable |
| Appearance[5] | PYB | PYB | PYB | PYB | PYB | PYB | PYB | PYB | PYB | PYB |
| OH-value, mgKOH/g | 16.7 | 18.1 | 16.6 | 13.8 | 13.9 | 11.2 | 27.8 | 27.4 | 16.4 | 16.8 |
| Polymer content, % | 40.2 | 35.5 | 40.7 | 50.6 | 50.3 | 60.0 | 50.4 | 50.2 | 50.4 | 40.0 |
| Viscosity, cps/25° C. | 9,200 | 7,800 | 9,700 | 17,000 | 11,000 | 38,000 | 5,600 | 7,300 | 7,500 | 12,900 |

Notes:
[1]Tetrahydrofurfuryl methacrylate,
[2]Tetrahydrofurfuryl acrylate,
[3]Acrylonitrile,
[4]Methyl methacrylate;
[5]PYB:pale yellowish brown

EXAMPLES 1 TO 12, AND 1* AND 2*

According to the formulations written in Table 3, polyurethane elastomer molded articles were produced by mixing the raw materials vigorously for 15 seconds and pouring into an iron mold (250 mm × 200 mm × 2.5 mm thickness) pre-heated to a temperature of 60° to 70° C., followed by demolding after 5 minutes and further annealing for an hour at 120° C. In Examples 11 and 12, annealing was carried out for an hour at 120° C. and then for additional an hour at 150° C. In Examples 2, 4, 7, 8 and 9, ZnCl₂ was dissolved in ethylene glycol. In Table 3 and hereinafter, Polymer polyols I to XX represent the polymer polyols produced according to Examples I to XX, respectively.

Properties of the molded articles were as shown in Table 3.

Judging from the hardness of the molded articles before and after annealing, crosslinking by ring-opening of epoxy radicals would have occurred for the most part simultaneously with urethane linkage-forming reaction in case of BF₃ curing (coupling or polymerization of epoxy radicals each other) in Examples 1 and 3, while ring-opening curing of epoxy radicals would have taken place in the course of annealing after urethane-forming reaction had progressed to a great extent in case of isocyanate curing (oxazolidone formation) in Examples 2 and 4 to 9.

EXAMPLE 13

To 100 parts of Polymer polyol IX, were added 8 parts of Curative D, and stirred for 3 hours at 150° C. Then, to the mixture, were added 1.5 parts of triethanol amine, 20 parts of 1,4-butane diol, 0.015 parts of DBTDL and 83 parts of Coronate 1055 and stirred vigorously, followed by pouring into a mold (250 mm × 200 mm × 2.5 mm thickness) pre-heated to a temperature of 60° to 70° C. The product was demolded after 10 minutes and then annealed for an hour at 120° C. to obtain a polyurethane elastomer molded article having the following properties:
Density: 1.16 g/cm³
Hardness, Shore D: 74
Tensile strength: 392 kg/cm²
Elongation: 40%

Flexural strength: 433 kg/cm$^2$
Flexural modulus: 13,200 kg/cm$^2$
Heat sag: 3 mm
Drop-weight distance: 20 cm

EXAMPLES 14 TO 16, AND 3* TO 6*

According to the formulations and the molding conditions written in Table 4, RIM urethanes and R-RIM urethanes were produced using a R-RIM macine (Krauss-Maffei PU 40/40) by injecting into a mold (1000 mm×1000 mm×2.5 mm thickness), followed by annealing for an hour at 120° C. and then for additional an hour at 150° C.

Properties were as shown in Table 4.

EXAMPLES 17 TO 19, AND 7* TO 9*

According to the formulations and the molding conditions written in Table 5, high-resilient foams, hot-molded foams and slab foams were produced. The foams of Examples 17 to 19 were annealed for an hour at 120° C. after demolding, in order to accelerate ring-opening crosslinking of epoxy radicals with isocyanate groups (formation of oxazolidone).

Properties of the foams were as shown in Table 5.

EXAMPLES 20 TO 24, AND 10*

Polyurethane elastomer molded articles were produced by vigorously mixing for 10 seconds 100 parts of each polymer polyol written in Table 6, 15 parts of ethylene glycol and 0.025 parts of DBTDL with Coronate 1055 in such an amount to provide NCO/OH equivalent ratio of 1.05 and pouring into the same mold as in Example 1, followed by demolding and annealing under the same conditions as in Example 1. Polymer polyol K, used in Example 10*, is a polymer polyol prepared from 800 parts of Polyol H and 208 parts of acrylonitrile, having polymer content of 20.1%, OH-value of 22.4 mgKOH/g and viscosity of 6,200 cps at 25° C.

Properties of the articles were as shown in Table 6.

EXAMPLES 25 TO 29, AND 11* TO 14*

According to the formulations and the molding conditions written in Table 7, RIM urethanes and R-RIM urethanes were produced using the same machine and the same mold as in Example 14, followed by annealing under conditions as follows:

Examples 25, 26, and 11* to 14*: an hour at 120° C.
Examples 27 to 29: an hour at 120° C.+an hour at 150° C.

Properties of these urethanes were as shown in Table 7.

EXAMPLES 30 TO 35

According to the formulations and the molding conditions written in Table 8, high-resilient foams, hot-molded foams and slab foams were produced. The foams of Examples 33 to 35 were annealed for an hour at 120° C. after demolding, in order to accelerate crosslinking.

Properties of the foams were as shown in Table 8.

EXAMPLES 36 TO 46

According to the formulations written in Table 9, polyurethane elastomer molded articles were produced in the same manner as in Example 20, except annealing at 150° C. instead of 120° C.

Properties of the articles were as shown in Table 9.

Properties of polyurethanes were measured as follows:

(1) Tensile strength, Elongation and Tear strength: JISK-6301.
(2) 25% ILD, 65% ILD and Ball rebound: JIS K-6401.
(3) Shore hardness: measured by Hardness Tester Type D.
(4) Flexural strength and modulus: measured at 25° C., using specimen of 25 mm×70 mm×2.5 mm (thickness), with span of 40 mm.
(5) Heat sag: a sag distance of tip of specimen (25 mm×150 mm×2.5 mm thickness), aged for an hour at 120° C. in the state of over hanging 100 mm length followed by allowing to stand for additional 30 minutes at room temperature in that state.
(6) Drop-weight distance: the minimum drop height giving damage to specimen, measured using Du Pont's drop-weight impact tester by dropping a weight of 1 kg under gravity in an atmosphere of −30° C.

TABLE 3

| | Example No. | | | | | | | | | | | | | |
|---|---|---|---|---|---|---|---|---|---|---|---|---|---|---|
| | 1 | 2 | 1 | 3 | 4 | 2 | 5 | 6 | 7 | 8 | 9 | 10 | 11 | 12 |
| Formulation, parts | | | | | | | | | | | | | | |
| Polymer polyol | II | II | II | III | III | III | I | IV | VIII | IX | X | XI | IX | IX |
| | 100 | 100 | 100 | 100 | 100 | 100 | 100 | 100 | 100 | 100 | 100 | 100 | 100 | 100 |
| Ethylene glycol | 15 | 15 | 15 | 15 | 15 | 15 | 15 | 15 | 15 | 15 | 15 | 15 | 15 | 15 |
| Curative | A 2 | B 46 | — | A 2 | B 42 | — | B 21 | B 26 | B 23 | B 10 | B 5 | E 1 | C 12 | D 8 |
| DBTDL | 3.3 | .08 | .025 | 3.3 | .08 | .025 | .05 | .05 | .05 | .05 | .05 | 1.6 | .06 | .02 |
| Accelerator[1] | — | c 1 | — | — | c 1 | — | a 2 | b 3 | c 1 | c 2 | c 2 | — | d 2 | — |
| Coronate 1055 | 78 | 78 | 78 | 78 | 78 | 78 | 83 | 78 | 79 | 78 | 78 | 78 | 78 | 78 |
| Properties of polyurethane | | | | | | | | | | | | | | |
| Density, g/cm | 1.19 | 1.22 | 1.20 | 1.19 | 1.19 | 1.19 | 1.15 | 1.20 | 1.19 | 1.16 | 1.19 | 1.18 | 1.17 | 1.20 |
| Hardness, Shore D | 72 | 77 | 71 | 76 | 76 | 75 | 69 | 76 | 77 | 75 | 75 | 74 | 73 | 73 |
| Tensile strength, kg/cm$^2$ | 263 | 526 | 216 | 366 | 445 | 315 | 243 | 461 | 482 | 412 | 420 | 361 | 355 | 311 |
| Elongation, % | 110 | 45 | 130 | 60 | 30 | 45 | 180 | 40 | 30 | 45 | 60 | 95 | 85 | 60 |
| Flexural strength, kg/cm$^2$ | 245 | 730 | 198 | 431 | 580 | 418 | 272 | 628 | 593 | 518 | 500 | 410 | 412 | 411 |
| Flexural modulus, 10$^3$kg/cm$^2$ | 6.2 | 17.0 | 4.12 | 12.9 | 26.2 | 12.1 | 7.69 | 14.4 | 24.3 | 14.1 | 13.6 | 11.1 | 11.2 | 11.0 |
| Heat sag, mm | 4 | 0 | 14 | 2 | 2 | 122 | 4 | 1.5 | 2 | 4 | 4 | 6 | 5 | 6 |
| Drop-weight | 25 | 15 | 5 | 15 | 10 | 5 | 60 | 25 | 10 | 30 | 50 | 30 | 55 | 15 |

TABLE 3-continued

| | Example No. | | | | | | | | | | | | |
|---|---|---|---|---|---|---|---|---|---|---|---|---|---|
| | 1 | 2 | 1 | 3 | 4 | 2 | 5 | 6 | 7 | 8 | 9 | 10 | 11 | 12 |
| distance, cm | | | | | | | | | | | | | |

Notes:
(1)a: LiCl;
b: (CH$_3$)$_4$NCl;
c: ZnCl$_2$;
d: Tris(dimethylaminomethyl)phenol.

TABLE 4

| | Example No. | | | | | | |
|---|---|---|---|---|---|---|---|
| | 14 | 15 | 16 | 3* | 4* | 5* | 6* |
| Formulation, parts | | | | | | | |
| Polymerpolyol X | 100 | 100 | 100 | — | — | — | — |
| Polyol H | — | — | — | 100 | 100 | 100 | 100 |
| Ethylene glycol | 10 | 15 | 15 | 15 | 35 | 35 | 35 |
| Black toner | 5 | 5 | 5 | 5 | 5 | 5 | 5 |
| DABCO 33LV | 0.5 | 0.5 | 0.5 | 0.5 | 0.5 | 0.5 | 0.5 |
| DBTDL | 0.1 | 0.1 | 0.1 | 0.02 | 0.04 | 0.04 | 0.05 |
| Curative | B 5 | B 5 | C 6 | — | — | — | — |
| ZnCl$_2$ | 2 | 2 | 2 | — | — | — | — |
| Freon-11 | 3 | 3 | 3 | 3 | 3 | 3 | 3 |
| FESS-0413 | — | — | — | — | — | 36 | 81 |
| Coronate 1055 | 54 | 78 | 78 | 78 | 181 | 181 | 181 |
| Molding conditions | | | | | | | |
| Delivery rate, kg/min. | 40 | 40 | 40 | 40 | 40 | 40 | 40 |
| Injection time, sec. | 4.5 | 4.5 | 4.5 | 4.5 | 4.5 | 4.5 | 4.5 |
| Feeding pressure, kg/cm$^2$G | 150 | 150 | 150 | 150 | 150 | 150 | 150 |
| Material temperature, °C. | 60 | 60 | 60 | 60 | 40 | 40 | 40 |
| Mold temperature, °C. | 80 | 80 | 80 | 80 | 70 | 70 | 70 |
| Demold time, min. | 0.5 | 0.5 | 0.5 | 0.5 | 0.5 | 1.5 | 1.5 |
| Properties of polyurethanes | | | | | | | |
| Density, g/cm$^3$ | 1.18 | 1.21 | 1.20 | 1.18 | 1.10 | 1.15 | 1.19 |
| Hardness, Shore D | 73 | 76 | 74 | 73 | 73 | 75 | 77 |
| Tensile strength, kg/cm$^2$ | 355 | 440 | 375 | 313 | 261 | 298 | 349 |
| Elongation, % | 105 | 65 | 95 | 95 | 120 | 50 | 30 |
| Flexural strength, kg/cm$^2$ | 346 | 492 | 423 | 378 | 286 | 391 | 417 |
| Flexural modulus, 10$^3$kg/cm$^2$ | 9.0 | 14.1 | 12.4 | 9.95 | 7.3 | 10.7 | 14.0 |
| Heat sag, mm | 4 | 1 | 2 | 12 | 7 | 3 | 1 |
| Drop-weight distance, cm | 70 | 60 | 65 | 15 | 15 | 10 | <5 |

TABLE 5

| | Example No. | | | | | |
|---|---|---|---|---|---|---|
| | 17 | 18 | 19 | 7* | 8* | 9* |
| Formulation, parts | | | | | | |
| Polymer polyol | VII | VI | V | VII | VI | V |
| | 40 | 50 | 100 | 40 | 50 | 100 |
| Polyol | G 60 | F 50 | — | G 60 | F 50 | — |
| Water | 2.5 | 4.5 | 2.2 | 2.5 | 4.5 | 2.2 |
| Foam stabilizer(1) | a 1.0 | b 1.1 | c 1.0 | a 1.0 | b 1.1 | c 1.0 |
| DABCO 33LV | 1.2 | 0.52 | — | 0.6 | 0.26 | — |
| TMED | 0.8 | — | — | 0.4 | — | — |
| Niax A-1 | — | 0.08 | — | — | 0.04 | — |
| DMEA | — | — | 1.6 | — | — | 0.8 |
| T-9 | — | 0.8 | 0.35 | — | 0.08 | 0.35 |
| ZnCl$_2$(2) | 0.5 | 0.5 | 0.5 | — | — | — |
| TDI-80 | 30.0 | 57.6 | 33.8 | 26.0 | 50.1 | 29.4 |
| Millionate MR-200 | 6.0 | — | — | 5.2 | — | — |
| Molding conditions | | | | | | |
| Type of mold(3) | A | B | C | A | B | C |
| Mold temperature, °C. | 55 | 40 | 28 | 55 | 40 | 28 |
| Material temperature, °C. | 28 | 28 | 28 | 28 | 28 | 28 |
| Oven temperature, °C. | 70 | 150 | — | 70 | 150 | — |
| Demold time, min. | 7 | 10 | — | 7 | 10 | — |
| Foam properties | | | | | | |
| Overall density, kg/cm$^3$ | 47.7 | 33.4 | 39.0 | 49.2 | 34.1 | 39.2 |
| 25% ILD, kg/314 cm$^2$ | 20.2 | 28.9 | 33.7 | 16.7 | 28.1 | 34.5 |
| 65% ILD, kg/314 cm$^2$ | 47.2 | 73.3 | 73.2 | 40.6 | 70.1 | 79.4 |
| Tear strength, kg/cm | 0.90 | 1.12 | 1.28 | 0.50 | 0.74 | 0.76 |
| Tensile strength, kg/cm$^2$ | 1.90 | 1.97 | 2.11 | 1.07 | 1.06 | 1.02 |
| Elongation, % | 145 | 120 | 90 | 96 | 82 | 68 |
| Ball rebound, % | 57 | 44 | 45 | 60 | 43 | 45 |

Notes:
(1)a: SRX-274C;
b: SRX-294A;
c: L-520
(2)dissolved in water
(3)A: 300 mm × 300 mm × 100 mm closed mold of iron,
B: 300 mm × 300 mm × 100 mm closed mold of aluminum,
C: 300 mm × 300 mm × 150 mm open mold of wood.

TABLE 6

| | Example No. | | | | | |
|---|---|---|---|---|---|---|
| | 20 | 21 | 22 | 23 | 24 | 10* |
| Polymer polyol | | | | | | |
| | XI | XIV | XV | XVI | XIX | K |
| Properties of polyurethanes | | | | | | |
| Density, g/cm$^3$ | 1.16 | 1.17 | 1.20 | 1.19 | 1.17 | 1.10 |
| Hardness, Shore D | 67 | 74 | 76 | 75 | 75 | 60 |
| Tensile strength, kg/cm$^2$ | 284 | 371 | 390 | 382 | 366 | 216 |
| Elongation, % | 95 | 65 | 40 | 75 | 50 | 130 |
| Flexural strength, kg/cm$^2$ | 323 | 457 | 611 | 446 | 421 | 162 |
| Flexural modulus, 10$^3$kg/cm$^2$ | 8.21 | 12.8 | 16.6 | 11.1 | 12.2 | 3.6 |

TABLE 7

| | Example No. | | | | | | | | |
|---|---|---|---|---|---|---|---|---|---|
| | 25 | 26 | 11* | 12* | 13* | 14* | 27 | 28 | 29 |
| Formulation, parts | | | | | | | | | |
| Polymer polyol | XV | XVI | K | K | K | K | XV | XV | XV |
| | 100 | 100 | 100 | 100 | 100 | 100 | 100 | 100 | 100 |
| Ethylene glycol | 15 | 15 | 15 | 25 | 15 | 15 | 10 | 15 | 15 |
| Black toner | 5 | 5 | 5 | 5 | 5 | 5 | 5 | 5 | 5 |
| DABCO 33LV | 0.5 | 0.5 | 0.5 | 0.5 | 0.5 | 0.5 | 0.5 | 0.5 | 0.5 |
| DBTDL | 0.02 | 0.02 | 0.02 | 0.03 | 0.035 | 0.05 | 0.1 | 0.1 | 0.1 |
| Curative | — | — | — | — | — | — | B 43 | B 43 | C 5 |
| ZnCl$_2$ | — | — | — | — | — | — | 2 | 2 | 2 |
| Freon-11 | 3 | 3 | 3 | 3 | 3 | 3 | 3 | 3 | 3 |
| FESS-0413 | — | — | — | — | 22.7 | 51.2 | — | — | — |
| Coronate 1055 | 78.3 | 79.0 | 81.1 | 30.5 | 81.1 | 81.1 | 54 | 79 | 79 |

TABLE 7-continued

| | Example No. | | | | | | | | |
|---|---|---|---|---|---|---|---|---|---|
| | 25 | 26 | 11* | 12* | 13* | 14* | 27 | 28 | 29 |
| Molding conditions | | | | | | | | | |
| Delivery rate, kg/min. | 40 | 40 | 40 | 40 | 40 | 40 | 40 | 40 | 40 |
| Injection time, sec. | 4.1 | 4.1 | 4.1 | 4.1 | 4.1 | 4.1 | 4.5 | 4.5 | 4.5 |
| Feeding pressure, kg/cm$^2$G | 150 | 150 | 150 | 150 | 150 | 150 | 150 | 150 | 150 |
| Material temperature, °C. | 60 | 50 | 50 | 50 | 50 | 60 | 60 | 60 | 60 |
| Mold temperature, °C. | 70 | 70 | 70 | 70 | 70 | 70 | 80 | 80 | 80 |
| Demold time, min. | 0.5 | 0.5 | 0.5 | 0.5 | 1.0 | 1.5 | 0.5 | 0.5 | 0.5 |
| Properties of polyurethanes | | | | | | | | | |
| Density, g/cm$^3$ | 1.06 | 1.05 | 1.05 | 1.03 | 1.06 | 1.08 | 1.18 | 1.19 | 1.21 |
| Hardness, Shore D | 76 | 73 | 59 | 267 | 66 | 70 | 73 | 76 | 75 |
| Tensile strength, kg/cm$^2$ | 398 | 362 | 210 | 245 | 225 | 272 | 343 | 420 | 368 |
| Elongation, % | 40 | 85 | 220 | 160 | 50 | 10 | 95 | 50 | 85 |
| Flexural strength, kg/cm$^2$ | 630 | 430 | 171 | 277 | 232 | 340 | 373 | 477 | 415 |
| Flexural modulus, 10$^3$ kg/cm$^2$ | 15.9 | 11.9 | 3.68 | 6.9 | 4.8 | 7.9 | 9.08 | 15.1 | 12.9 |
| Heat sag, mm | | | | | | | 3 | 2 | 2 |
| Drop-weight distance, cm | | | | | | | 55 | 25 | 40 |

TABLE 8

| | Example No. | | | | | |
|---|---|---|---|---|---|---|
| | 30 | 31 | 32 | 33 | 34 | 35 |
| Formulation, parts | | | | | | |
| Polymer polyol | XIX 40 | XVIII 50 | XVII 100 | XIX 40 | XVIII 50 | XVII 100 |
| Polyol | G 60 | F 50 | — | G 60 | F 50 | — |
| Water | 2.5 | 4.5 | 2.2 | 2.5 | 4.5 | 2.2 |
| Foam stabilizer[1] | a 1.0 | b 1.1 | c 1.0 | a 1.0 | b 1.1 | c 1.0 |
| DABCO 33LV | 0.6 | 0.26 | — | 0.6 | 0.26 | — |
| TMED | 0.4 | — | — | 0.4 | — | — |
| Niax A-1 | — | 0.04 | — | — | 0.04 | — |
| DMEA | — | — | 0.8 | — | — | 0.8 |
| T-9 | — | 0.08 | 0.35 | — | 0.08 | 0.35 |
| ZnCl$_2$[2] | — | — | — | 0.5 | 0.5 | 0.5 |
| TDI-80 | 26.0 | 50.1 | 29.4 | 27.1 | 51.4 | 32.0 |
| Millionate MR-200 | 5.2 | — | — | 5.5 | — | — |
| Molding conditions | | | | | | |
| Type of mold[3] | A | B | C | A | B | C |
| Mold temperature, °C. | 55 | 40 | 28 | 55 | 40 | 28 |
| Material temperature, °C. | 28 | 28 | 28 | 28 | 28 | 28 |
| Oven temperature, °C. | 70 | 150 | — | 70 | 150 | — |
| Demold time, min. | 7 | 10 | — | 7 | 10 | — |
| Foam properties | | | | | | |
| Overall density, kg/cm$^3$ | 48.8 | 35.0 | 40.1 | 48.0 | 33.8 | 39.4 |
| 25% ILD, kg/314 cm$^2$ | 17.1 | 29.8 | 36.3 | 19.7 | 30.3 | 35.7 |
| 65% ILD, kg/314 cm$^2$ | 42.2 | 73.2 | 83.5 | 47.6 | 70.4 | 80.1 |
| Tear strength, kg/cm | 0.58 | 0.76 | 0.81 | 0.93 | 1.09 | 1.22 |
| Tensile strength, kg/cm$^2$ | 1.12 | 1.09 | 1.06 | 1.80 | 1.85 | 1.91 |
| Elongation, % | 89 | 77 | 60 | 130 | 110 | 85 |
| Ball rebound, % | 60 | 42 | 43 | 58 | 43 | 43 |

Notes: [1], [2] and [3]: same as in Table 5.

TABLE 9

| | Example No. | | | | | | | | | | |
|---|---|---|---|---|---|---|---|---|---|---|---|
| | 36 | 37 | 38 | 39 | 40 | 41 | 42 | 43 | 44 | 45 | 46 |
| Formulation, parts | | | | | | | | | | | |
| Polymer polyol | XI | XI | XX | XX | XII | XIII | XIV | XV | XVI | XV | XVI |
| | 100 | 100 | 100 | 100 | 100 | 100 | 100 | 100 | 100 | 100 | 100 |
| Ethylene glycol | 15 | 15 | 15 | 15 | 15 | 15 | 15 | 15 | 15 | 15 | 15 |
| Curative | A 2 | B 17 | A 2 | B 19 | B 21 | B 11 | B 9 | B 5 | B 5 | G 5 | G 6 |
| DBTDL | 3.3 | 0.08 | 3.3 | 0.08 | 0.05 | 0.05 | 0.05 | 0.05 | 0.05 | 0.07 | 0.07 |
| ZnCl$_2$[1] | — | 1 | — | 1 | 1 | 1 | 1 | 1 | 1 | 2 | 2 |
| Coronate 1055 | 78.7 | 78.7 | 78.7 | 78.7 | 79.0 | 78.6 | 77.9 | 77.9 | 77.1 | 77.9 | 77.1 |
| Properties of polyurethanes | | | | | | | | | | | |
| Density, g/cm$^3$ | 1.12 | 1.20 | 1.13 | 1.19 | 1.15 | 1.16 | 1.20 | 1.19 | 1.19 | 1.18 | 1.20 |
| Hardness, Shore D | 67 | 74 | 65 | 73 | 74 | 73 | 75 | 75 | 77 | 73 | 76 |
| Tensile strength, kg/cm$^2$ | 291 | 323 | 224 | 316 | 316 | 327 | 381 | 416 | 436 | 322 | 403 |
| Elongation, % | 70 | 50 | 85 | 60 | 30 | 40 | 75 | 65 | 25 | 90 | 30 |
| Flexural strength, kg/cm$^2$ | 330 | 351 | 251 | 370 | 378 | 432 | 464 | 482 | 520 | 365 | 471 |
| Flexural modulus, 10$^3$kg/cm$^2$ | 8.41 | 11.9 | 5.60 | 9.96 | 9.84 | 10.6 | 14.2 | 14.9 | 19.2 | 11.8 | 16.5 |
| Heat sag, mm | 5 | 3 | 5 | 2 | 2 | 3 | 3 | 2 | 1 | 3 | 2 |

TABLE 9-continued

| | Example No. | | | | | | | | | | |
|---|---|---|---|---|---|---|---|---|---|---|---|
| | 36 | 37 | 38 | 39 | 40 | 41 | 42 | 43 | 44 | 45 | 46 |
| Drop-weight distance, cm | 20 | 30 | 30 | 45 | 60 | 40 | 35 | 20 | 10 | 45 | 25 |

Note:
(1)dissolved in ethylene glycol.

What is claimed as new and desired to be secured by Letters Patent is:

1. A process for producing a cellular or noncellular polyurethane having improved rigidity and heat resistance, which comprises:

reacting at least one organic polyisocyanate with a polyol component in the presence of or in the absence of a blowing agent, at least a part of the polyol component being at least one epoxy-containing polymer polyol derived from at least one polyol having an equivalent weight of 200–4,000 and at least one ethylenically unsaturated monomer comprising an epoxy radical-containing monomer; and bringing about ring-opening reaction of the epoxy radicals, in the presence of an epoxy curing agent with or without an epoxy curing accelerator, simultaneously with, before or after the urethane-forming reaction.

2. The process of claim 1, wherein said curing agent is at least one compound selected from the class consisting of organic polyisocyanates, polyamines, acid anhydrides and Lewis acids.

3. The process of claim 1, wherein said polymer polyol is produced by polymerizing, in situ in said polyol, (a) at least one epoxy radical-containing monomer, and (b) acrylonitrile, methacrylonitrile or combination of them, with or without (c) one or more other ethylenically unsaturated comonomers.

4. The process of claim 1, wherein the epoxy radical-containing monomer is at least one compound selected from the class consisting of unsaturated hydrocarbon oxides, and unsaturated esters, ethers, urethanes, amides or acetals, which contain one or more epoxy radicals selected from 1,2-, 1,3-, 1,4- and 1.5-epoxide radicals.

5. The process of claim 1, wherein the epoxy radical-containing monomer is at least one monomer selected from the class consisting of unsaturated hydrocarbon oxides, glycidyl radical containing monomers and tetrahydrofuran ring-containing monomers.

6. The process of claim 5, wherein the glycidyl radical containing monomer is selected from the class consisting of glycidyl esters of unsaturated monocarboxylic acids, diglycidyl esters of unsaturated dicarboxylic acids, mono-$C_1$-$C_{18}$alkyl-monoglycidyl esters of unsaturated dicarboxylic acids, and unsaturated glycidyl ethers.

7. The process of claim 5, wherein the glycidyl radical-containing monomer is glycidyl methacrylate, glycidyl acrylate, or combination of them.

8. The process of claim 5, wherein the glycidyl radical-containing monomer is glycidyl methacrylate.

9. The process of claim 3, wherein said comonomer (c) is at least one monomer selected from the class consisting of unsaturated hydrocarbons, substituted styrenes, acrylic and substituted acrylic monomers, vinyl esters, vinyl ethers, vinyl ketones, other substituted vinyl monomers, unsaturated dicarboxylic acids and esters thereof.

10. The process of claim 3, wherein said comonomer (c) is methyl methacrylate, styrene or combination of them.

11. The process of claim 1, wherein at least 3% by weight of said unsaturated monomer is the epoxy radical-containing monomer.

12. The process of claim 3, wherein said polymer polyol is produced from 5–95% of (a), 5–95% of (b) and 0–60% of (c), based on the total weight of the monomers.

13. The process of claim 1, wherein said polyol having an equivalent weight of 200–4,000 is at least one selected from the class consisting of polyether polyols, polyester polyols, urethane polyols and vinyl-modified polyols.

14. The process of claim 1, wherein said polymer polyol contains 30–70% by weight of polymer derived from said monomer.

15. The process of claim 1, wherein the ring-opening reaction is brought about in the presence of at least one epoxy curing accelerator, selected from the class consisting of amines, basic alkali metal compounds, metal halides, organo metal compounds, quaternary ammonium compounds, phosphorus compounds and borate esters.

16. The process of claim 1, wherein said polyisocyanate is reacted with said polyol component in the presence of at least one catalyst for NCO reaction, selected from the class consisting of tertiary amines, secondary amines, alkali metal compounds, phosphines, metal chelate compounds, organo tin compounds, and other organo metal compounds.

17. The process of claim 1, wherein said polyisocyanate is reacted in the presence of at least one blowing agent, selected from the class consisting of halogenated hydrocarbons, low-boiling hydrocarbons, halogen-free volatile organic solvents and reactive blowing agents.

18. The process of claim 1, wherein the polyurethane is produced in the presence of at least one additive, selected from the class consisting of epoxy resins, surfactants, flame retardants, retardants, colorants, internal mold release agents, stabilizers, germicides and fillers.

19. The process of claim 1, wherein the polyol component comprises at least 20% by weight of said polymer polyol, and 0–80% by weight of at least one other active hydrogen atom-containing compound selected from the class consisting of high molecular weight polyols having an equivalent weight of 200–4,000, high molecular weight polyamines having an equivalent weight of 200–4,000, and low molecular weight compounds containing at least two active hydrogen atom-containing groups and having an equivalent weight less than 200.

20. The process of claim 1, wherein said curing agent is used in an amount of 0.5–200 parts by weight per 100 parts by weight of said polymer polyol.

21. The process of claim 1, wherein a Lewis acid is used as said curing agent in an amount of 0.5–20 parts by weight per 100 parts by weight of said polymer polyol.

22. The process of claim 1, wherein a polyamine or acid anhydride is used as said curing agent in such an amount providing an equivalent ratio of (NCO group-+epoxy radical)/(active hydrogen atom-containing group+reactive group of said curing agent) of 0.7–1.3/1.

23. The process of claim 1, wherein an organic polyisocyanate is used as said curing agent in such an amount providing an equivalent ratio of NCO group/(active hydrogen atom-containing group+epoxy radical) of 0.3–1.3/1.

24. The process of claim 1, wherein NCO index in the urethane-forming reaction is 80–120.

25. The process of claim 1, wherein NCO index in the urethane-forming reaction is 300–1,000 to produce isocyanurate rings in the polyurethane.

26. The process of claim 1, wherein the ring opening reaction is brought about to crosslink between polymer portions of said polymer polyol or between polymer portion of said polymer polyol and polyurethane segment, or both.

27. The process of claim 1 wherein said polyisocyanate is reacted with said polyol component by conditioning them to a temperature of 25°–90° C., intimately mixing said components under a pressure of 100–200 kg/cm² g, injecting said mixture into a mold preheated to a temperature 30°–120° C., and thereafter demolding the resulting article.

28. A cellular or noncellular polyurethane, obtained by the process of claim 1.

29. The polyurethane of claim 28, having a density of 0.01–1.4 g/cm³.

30. A polyurethane molded article, obtained by the process of claim 27.

31. A crosslinked polyurethane, obtained by the process of claim 26.

32. The process of claim 1, wherein said ring-opening reaction of epoxy radicals is brought about simultaneously with the urethane-forming reaction.

33. The process of claim 1, wherein the ring-opening reaction of epoxy radicals is brought about after the urethane-forming reaction.

* * * * *